United States Patent [19]

Aoyama et al.

[11] Patent Number: 5,508,488
[45] Date of Patent: Apr. 16, 1996

[54] METHOD OF PROJECTION-WELDING BOLTS

[76] Inventors: Yoshitaka Aoyama; Shoji Aoyama, both of 20-11, Makitsukadai 2-cho, Sakai-shi, Osaka 590-01, Japan

[21] Appl. No.: 299,118

[22] Filed: Sep. 2, 1994

[30] Foreign Application Priority Data

Feb. 15, 1994 [JP] Japan .................................. 6-056544

[51] Int. Cl.⁶ ................................................. B23K 11/14
[52] U.S. Cl. ........................................................ 219/93
[58] Field of Search ................................................ 219/93

[56] References Cited

U.S. PATENT DOCUMENTS

| | | | |
|---|---|---|---|
| 1,101,858 | 6/1914 | Lachman | 219/93 |
| 1,982,098 | 11/1934 | Hartmann | 219/93 |
| 3,225,172 | 12/1965 | Nooker et al. | 219/93 |
| 4,382,172 | 5/1983 | Takasugi et al. | 219/93 |

FOREIGN PATENT DOCUMENTS 129183  1/1977  Germany ................................ 219/93

*Primary Examiner*—Teresa J. Walberg
*Assistant Examiner*—J. Pelham
*Attorney, Agent, or Firm*—Nikaido, Marmelstein, Murray & Oram

[57] ABSTRACT

This invention is intended to secure a fused area which is as large as possible in fixing a flanged bolt in position by projection welding. A welding method characterized by forming a flange 3 with a flat bulge 4 having a crest 5 and enlarging the melting starting at the crest 5 throughout the bulge while pressing the crest 5 against a mating member 7. And the flange and the mating member are strongly clamped between a fixed electrode 6 and a movable electrode 8. As for the shape of the bulge, it may be tapered, spherical or the like. Further, the diameter of the bulge 4 is set so that it is greater than the diameter of the bolt stem 2.

8 Claims, 3 Drawing Sheets

METHOD OF PROJECTION-WELDING BOLTS

BACKGROUND OF THE INVENTION

This invention relates to a method of projection-welding bolts and is utilized, for example, in a field where bolts are welded to the floor panel of an automobile.

In the case of welding bolts to a part in the form of a steel sheet, as shown in FIG. 12, a flange F integral with a bolt B is formed with a plurality of projections (resembling warts) P, which projections will be fused in welding. In this case, generally a steel sheet part is placed on the fixed electrode and a bolt is pressed against the steel sheet part by the movable electrode. In this state, electric current is passed to effect fusion of the projections.

With the prior art as described above, since only the projections are fused, the fused area available is no more than the total area of the projections; therefore, a high welding strength resulting from a large fused area cannot be attained. Further, because of the fusion solely of the projections, the flange projects from the steel sheet part by the amount corresponding to its thickness, sometimes resulting in the part occupying an excessively large installation space.

SUMMARY OF THE INVENTION

The present invention has been provided to solve the problems described above. Claim 1 is a method of projection-welding bolts, comprising the steps of forming the flange surface of a bolt having a circular flange with a flat bulge having a crest, and passing a welding current while pressing the crest of said bulge against a mating member, whereby the weld molten between the crest and the mating member is enlarged through the entire bulge; the molten region is enlarged from the crest through the entire bulge to provide a wide fused area.

Claim 2 is a method of projection-welding bolts, as set forth in claim 1, characterized in that the flange and a mating member are strongly clamped between a movable electrode and a fixed electrode; the bulge and the mating member are strongly pressed against each other.

Claim 3 is a method of projection-welding bolts, as set forth in claim 1, characterized in that the bulge is tapered; the fusion spreads from the crest of the taper.

Claim 4 is a method of projection-welding bolts, as set forth in claim 1, characterized in that the diameter of the bulge is greater than that of the bolt; the fused area is greater than the cross-sectional area of the bolt stem portion.

The invention will now be described in more detail with reference to the drawing, in which.

DESCRIPTION OF THE PREFERRED EMBODIMENTS

Figure 1:
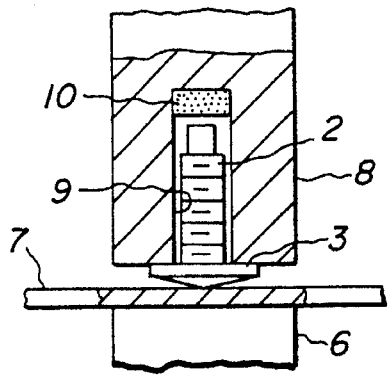
FIG. 1 is a side view, in longitudinal section, showing the welding starting time.

The invention will now be described in detail with reference to an embodiment shown in FIGS. 1 through 6. The dimensions of the various portions of a bolt 1 employed here are as shown in FIG. 2: the length 1 is 18 mm; the diameter d1 of the stem 2 is 6 mm; the diameter d2 of the conical, i.e., circular flange 3 is 10 mm; the thickness t1 of the flange is 1 mm; the height t2 of the tapered bulge 4 is 0.5 mm; the angle of inclination, θ, of the tapered portion is about 5°. the bulge 4 being flat and having a crest 5 on the centerline of the bolt 1 in the single state. In addition, most of the bolts to be welded to steel sheet parts for automobiles have a stem diameter of about 5 mm but those having a stem diameter of about 4–8 mm are also used. This bolt 1 is sized such that the diameter of the bulge 4 is equal to the diameter of the flange 3 and d1<d2.

Figure 2:
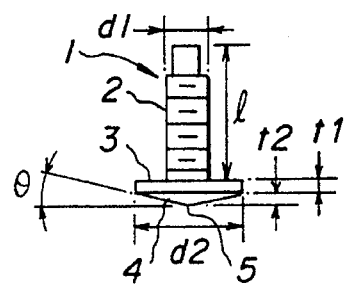
FIG. 2 is an external appearance front view of a bolt.

FIG. 1 shows the bolt 1 of FIG. 2 being welded, with a steel sheet part 7, which is a mating member, placed on a fixed electrode 6. A movable electrode 8 which pairs up with the fixed electrode 6 is formed with receiving hole 9 for receiving the stem 2 of the bolt, with a magnet (permanent magnet) 10 fitted in the innermost region of the hole for preventing the bolt 1 from failing down. Though not shown, the movable electrode 8 is advanced and retracted by drive means, such as an air cylinder, Thus, when the movable electrode 8 is away from the steel sheet part 7, the stem 2 of the bolt is inserted in the receiving hole 9. The relation between the depth of the receiving hole 9 and the length of the stem 2 is such that in the inserted state, the rear surface of the flange 3 is in intimate contact with the lower end surface of the movable electrode 8. Various methods for inserting the stem 2 in the receiving hole 9 may be employed, but the simplest one is for the operator to manually insert or there is a method in which the bolt 1 is held by a feed rod and automatically inserted. In addition, the thickness of the steel sheet part 7 in this embodiment is 1.5 min.

Figure 3:
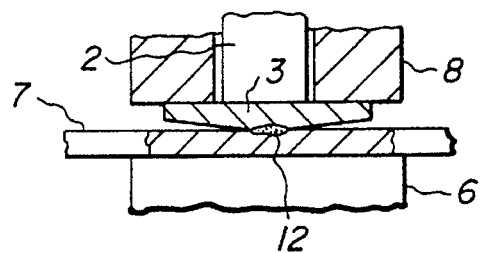
FIG. 3 is a fragmentary side view, in longitudinal section, showing the initial fusion period.
Figure 4:
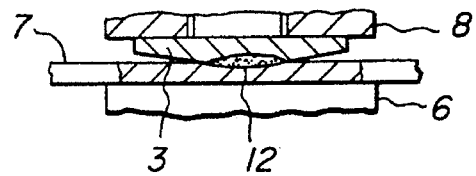
FIG. 4 is a fragmentary side view, in longitudinal section, showing the middle fusion period.
Figure 5:
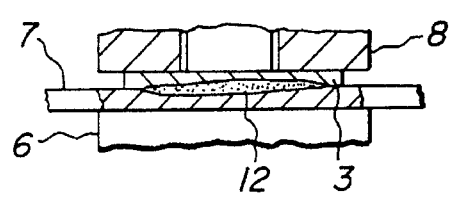
FIG. 5 is a fragmentary side view, in longitudinal section, showing the terminal fusion period.

In the state shown in FIG. 1, the movable electrode 8 has been lowered with the crest 5 of the bulge. The operation is continued under the conditions; the pressure on the movable electrode 8 is 130 kg; the current is 16700 A, the current passage period is 3/60 seconds. In the initial stage, as shown in FIG. 3, the region around the crest 5 and the corresponding portion of the steel sheet part 7 begin to melt. As the operation proceeds, the molten region enlarges to the extent shown in FIG. 4, finally reaching the state in which as shown in FIG. 5, the molten region spreads throughout the flange, i.e., a welding nugget is formed, with the entire flange 3 intimately contacted with the surface of the steel sheet part 7. The flange 3, under a pressure of 130 kg, sinks into the steel sheet part 7, such sunk portion being indicated by the reference character 11. Such sinking is due to the hardness of the outer side of the welding nugget being lowered by the high heat.

The bolt 1 welded under said conditions did not develop separation of the weld even if it was strongly hammered in the direction to level the bolt 1. Further, when torque is applied to the bolt, separation of the weld due to torsion did not take place until the torque reaches 170 kg-cm.

Figure 11:
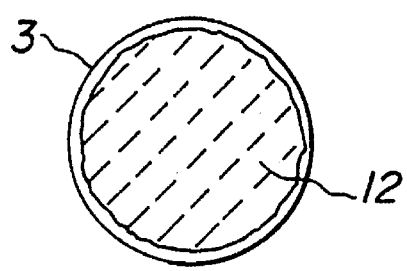
FIG. 11 is a plan view showing the shape of a fused portion.
Figure 12:
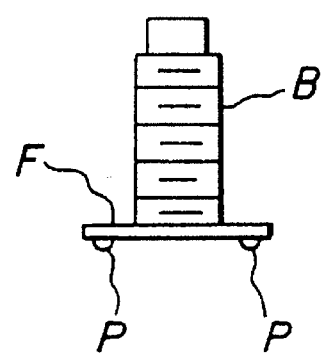
FIG. 12 is an external appearance side view of a bolt used in a conventional method.

Since the bulge 4 has a low tapered shape, that is, since the angle θ is about 5°, even a slight displacement of the molten region (welding nugget) 12 rapidly enlarges to assume the state shown in FIG. 5. The procedure of the melting and enlargement of the molten region 12 are such that the strong clamping of the flange 3 and steel sheet part 7 between the movable and fixed electrodes 8 and 6 results in the amounts of molten metal in the bulge 4 and the steel sheet part being substantially equal, making the form of the molten region 12 suitable for increasing the fusion strength, as shown in FIG. 5. When an excessive amount of torsion is applied to cause torsional separation and the form of the fused region 12 is observed, it is seen that almost all region of the flange is fused, as shown in FIG. 11. This fused area is increased as the current passage period and pressure are increased, as will be later described.

If the angle θ is less than 3°, it becomes difficult to make the crest 5 pointed and hence the Joule heat in the initial period shown in FIG. 3 is insufficient, making it difficult to set the pressure and current values. If the angle θ is not less than 9°, a clearance will be left in the end of the flange, leading to the shortage of the fused area; thus, sufficient welding strength cannot be obtained.

The bolts 1 of FIG. 2 were welded to 1.5-mm thick steel sheet parts while varying the conditions and the data, shown in terms of the torque value obtained at the instant of the bolt being wrenched off are shown below.

(1) At a current value of 16700 A and a pressure of 130 kg, a current passage period of 1/60 second was taken as 1 cycle, and this cycle value was varied. Then, the above torque value was as follows.

For 3 cycles; 170 kgf-cm
For 4 cycles; 200 kgf-cm
For 5 cycles; 260 kgf-cm (2) At a current value of 16700 A and a pressure of 150 kg, a current passage period of 1/60 second was taken as 1 cycle, and this cycle value was varied. Then, the above torque value was as follows.

For 3 cycles; 180 kgf-cm
For 4 cycles; 220 kgf-cm
For 5 cycles; 240 kgf-cm (3) At a current value of 15700 A and a pressure of 170 kg, a current passage period of 1/60 second was taken as 1 cycle, and this cycle value was varied. Then, the above torque value was as follows.

For 3 cycles; 200 kgf-cm
For 4 cycles; 220 kgf-cm
For 5 cycles; 230 kgf-cm

In addition, since the torque values taken at the instant of wrench-off were determined by naked eye, there would be more or less variation in the determined values; however, permissible data were obtained thanks to the operator's skill.

It has become apparent from the above data that the torque value is proportional to the current passage period, a fact which is directly connected with increasing the fused area, as shown in FIG. 11. As for the maximum torque value, the 260 kgf-cm in (1) is noted; thus, as considered from the combinations of the thickness of steel sheet parts and the various dimensions of bolts it seems that the conditions in (1) were best.

The above embodiment refers to an arrangement wherein the movable electrode is formed with a receiving hole; however, such receiving hole may be formed in the fixed electrode for receiving the bolt and then a steel sheet part may be placed thereon, whereupon the movable electrode may be actuated.

Figure 7:
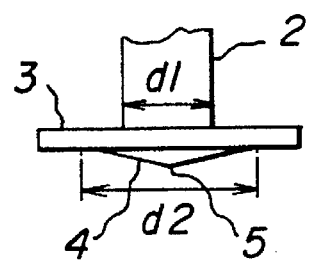
FIG. 7 is an external appearance front view showing another bolt shape.
Figure 8:
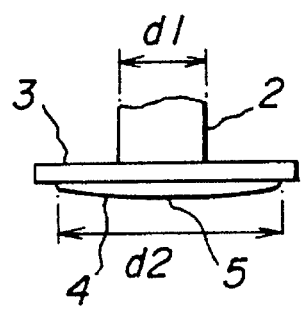
FIG. 8 is an external appearance front view showing another bolt shape.
Figure 9:
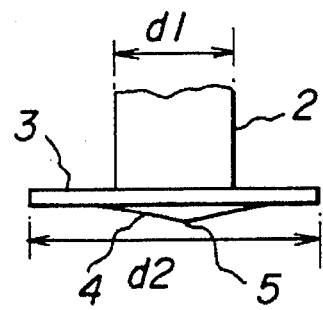
FIG. 9 is an external appearance front view showing another bolt shape.

In a bolt shown in FIG. 7, the diameter of the tapered bulge 4 is made smaller than that of the flange 3, and $d_1 < d_2$. In a bolt shown in FIG. 8, the bulge 4 is spherical, the highest region in the middle is the crest 5, and $d_1 < d_2$. A bolt shown in FIG. 9 is not in the form of straight taper as in FIG. 2 but is formed with a recessed surfacelike bulge 4 and $d_1 < d_2$.

Figure 10:
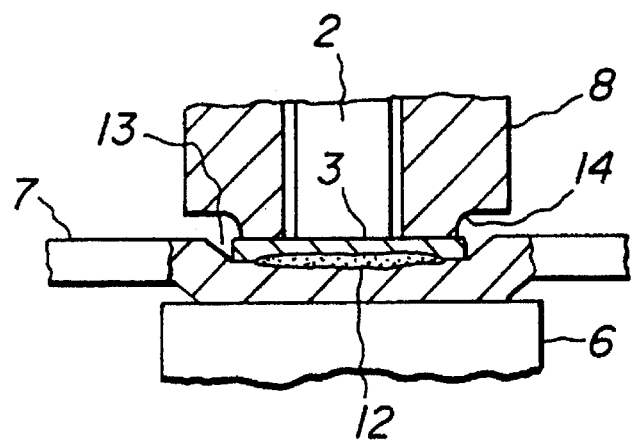
FIG. 10 is a fragmentary side view, in longitudinal section, showing another fused state.

In an embodiment shown in FIG. 10, the steel sheet part 7 is formed in advance with a recess 13 and fusion like that in FIG. 5 is effected in the bottom. By so doing, the front surface of the steel sheet part 7 and the rear surface of the flange 3 are flush with each other, with no possibility of the flange projecting. In addition, the outer peripheral portion of the lower end of the movable electrode is cut away as indicated by the reference character 14, so as to prevent the movable electrode 8 from coming in contact with the steel sheet plate 7 to cause abnormal current passage.

Figure 6:
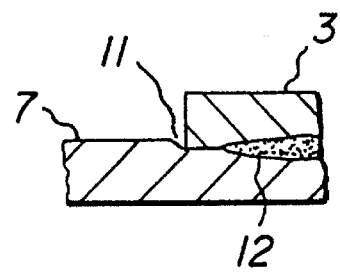
FIG. 6 is a fragmentary side view, in longitudinal section, showing the sinking state.

According to the present invention, the flange surface of a bolt is formed with a flat bulge having a crest and projection is effected by pressing said crest against a mating member. Therefore, the molten portion extending from the crest is enlarged throughout the bulge, thus making it possible to provide a large fused area. Particularly, since the flat bulge forms a wide fused portion by a slight pressed displacement, sufficient fused area can be obtained by the same degree of pressing stroke as that in the prior art wartlike projections. Since the flange of the bolt and the mating member are strongly clamped between the movable and fixed electrodes, this is effective to rapidly and reliably enlarge the melting phenomenon taking place therebetween. Further, depending upon the setting of pressure, it is possible to cause the flange to sink into the mating member, as shown in FIG. 6, a fact which is effective to increase the bonding strength and which is also advantageous for space saving. By establishing the relation $d_1 < d_2$ as described in each figure, a fused area which is greater than the cross sectional area of the bolt stem can be obtained, a fact which is very effective for welding strength.

What is claimed is:

1. A method of projection-welding bolts, comprising the step of:

forming a flange surface of a bolt having a circular flange with a bulge having a crest, said bulge tapering substantially linearly from the crest toward the flange with an angle of inclination of an outer surface of said bulge being in a range of 3° to 90°; and passing a welding current while pressing the crest of said bulge against a mating member, whereby a welded portion between the crests and the mating member is enlarged through the entire bulge.

2. A method of projection-welding bolts, as set forth in claim 1, wherein the flange and a mating member are strongly clamped between a movable electrode and a fixed electrode.

3. A method of projection-welding bolts, as set forth in claim 1, wherein the diameter of the bulge is formed to be greater than that of the bolt.

4. A method of projection-welding bolts as recited in claim 1, wherein said step of forming the flange surface includes forming the bulge such that the crest is a point in a center of the bulge.

5. A method of projection-welding bolts as recited in claim 1, wherein the step of forming the flange surface includes forming the crest to be rounded.

6. A method for projection-welding bolts as recited in claim 1, wherein step of forming the flange surface includes forming the bulge such that the substantially linear bulge provides a convex outer surface of the bulge.

7. A method of projection-welding bolts as recited in claim 1, wherein said angle of inclination is 5°.

8. A method of projection-welding bolts, said method comprising the steps of:

forming a flange surface of a bolt having a circular flange, said circular flange being thicker toward a central portion thereof than toward a periphery of the flange surface, said central portion of said circular flange having crest thereupon, wherein a surface of said flange provides a concave outer surface between the periphery of the flange and the crest thereof; and passing a welding current while passing the crest of the central portion of the circular flange against a mating member, whereby a welded portion between the crest and the mating member is enlarged through the central portion.

\* \* \* \* \*

UNITED STATES PATENT AND TRADEMARK OFFICE
CERTIFICATE OF CORRECTION

PATENT NO. : 5,508,488 Page 1 of 1
DATED : April 16, 1996
INVENTOR(S) : Yoshitaka Aoyama et al.

It is certified that error appears in the above-identified patent and that said Letters Patent is hereby corrected as shown below:

Column 4,
Line 58, delete "90°'" and substitute with -- 9° --.

Signed and Sealed this

Thirtieth Day of May, 2006

JON W. DUDAS
*Director of the United States Patent and Trademark Office*